(12) United States Patent
Zhang et al.

(10) Patent No.: US 8,687,656 B2
(45) Date of Patent: *Apr. 1, 2014

(54) METHOD AND SYSTEM FOR PROVIDING FASTER CHANNEL SWITCHING IN A DIGITAL BROADCAST SYSTEM

(75) Inventors: Weimin Zhang, San Jose, CA (US); Bin-Fan Liu, Livermore, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/589,827

(22) Filed: Aug. 20, 2012

(65) Prior Publication Data

US 2012/0307843 A1    Dec. 6, 2012

Related U.S. Application Data

(63) Continuation of application No. 11/084,058, filed on Mar. 17, 2005, now Pat. No. 8,249,113.

(60) Provisional application No. 60/554,715, filed on Mar. 19, 2004.

(51) Int. Cl.
*H04L 1/00* (2006.01)

(52) U.S. Cl.
USPC .......................................... 370/486; 370/509

(58) Field of Classification Search
USPC .................................................. 370/486, 509
See application file for complete search history.

(56) References Cited

U.S. PATENT DOCUMENTS

| | | |
|---|---|---|
| 6,658,199 B1 | 12/2003 | Hallberg |
| 7,174,561 B2 | 2/2007 | Bixby et al. |
| 8,249,113 B2 | 8/2012 | Zhang et al. |
| 2002/0168175 A1 | 11/2002 | Green et al. |
| 2004/0066854 A1 | 4/2004 | Hannuksela |
| 2004/0131118 A1 | 7/2004 | Kim et al. |
| 2004/0160974 A1 | 8/2004 | Read et al. |
| 2004/0181813 A1 | 9/2004 | Ota et al. |
| 2004/0194134 A1 | 9/2004 | Gunatilake et al. |
| 2005/0053135 A1 | 3/2005 | Haskell et al. |

*Primary Examiner* — Sai-Ming Chan
(74) *Attorney, Agent, or Firm* — Sterne, Kessler, Goldstein & Fox P.L.L.C.

(57) ABSTRACT

Methods, apparatuses, and systems are presented for switching between channels of encoded media data involving receiving encoded media data including reference frames and dependent frames for a plurality of channels, wherein each dependent frame refers to at least one reference frame. Frames associated with a first channel from the plurality of channels are decoded to generate a decoded signal for the first channel. While decoding frames associated with the first channel, data corresponding to at least one reference frame associated with a second channel from the plurality of channels are stored. In response to a control signal for switching from the first to the second channel, at least one dependent frame associated with the second channel is decoded by utilizing the stored data corresponding to the at least one reference frame associated with the second channel, to generate a decoded signal for the second channel.

20 Claims, 7 Drawing Sheets

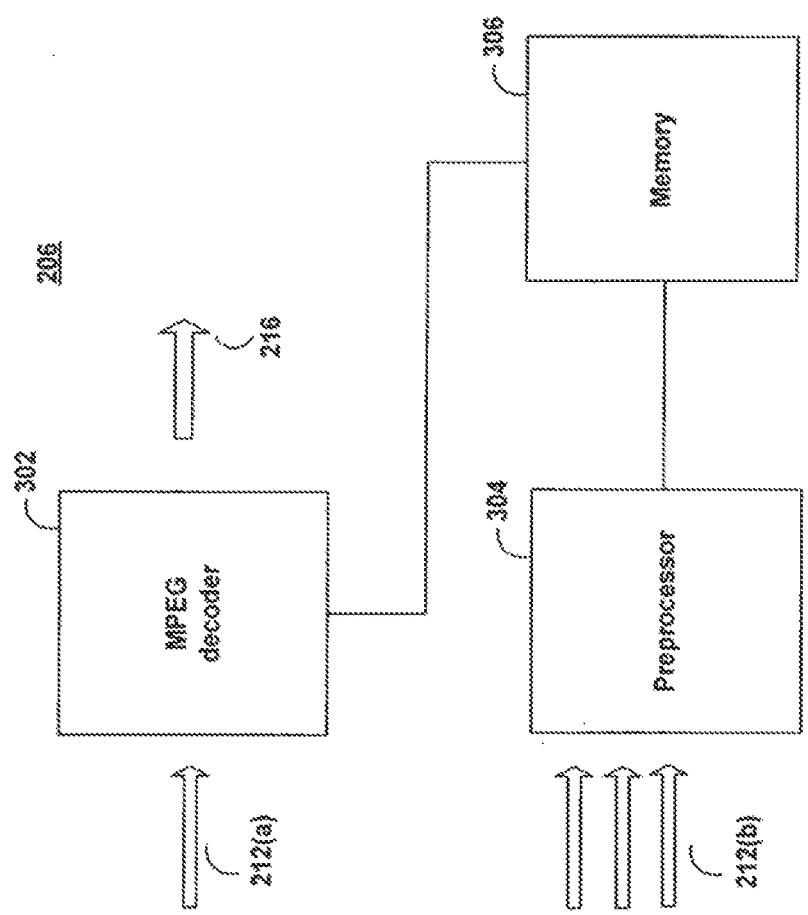

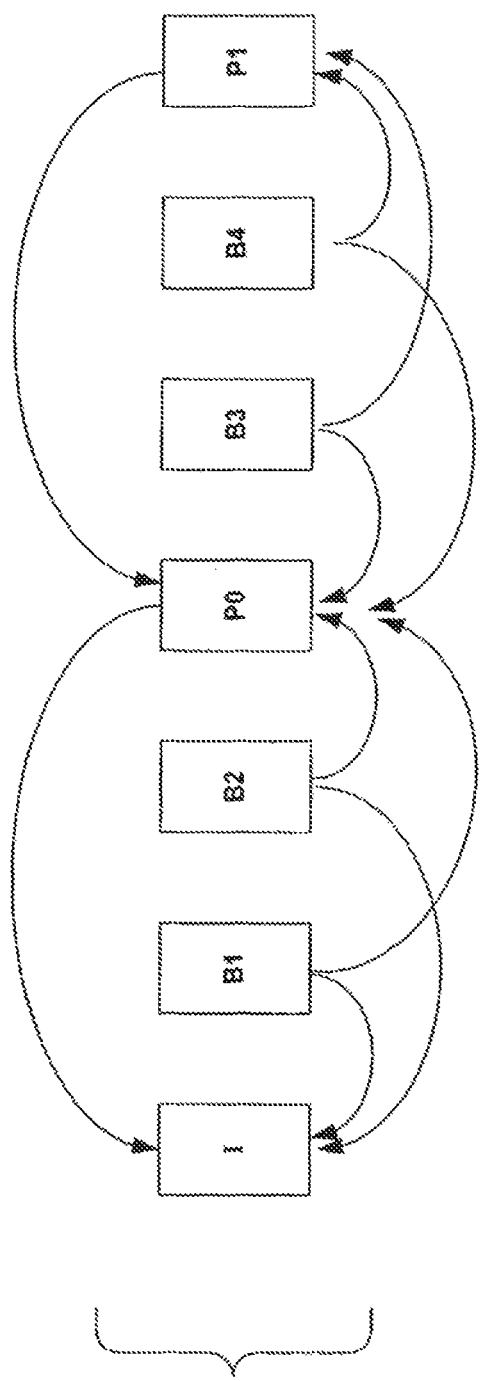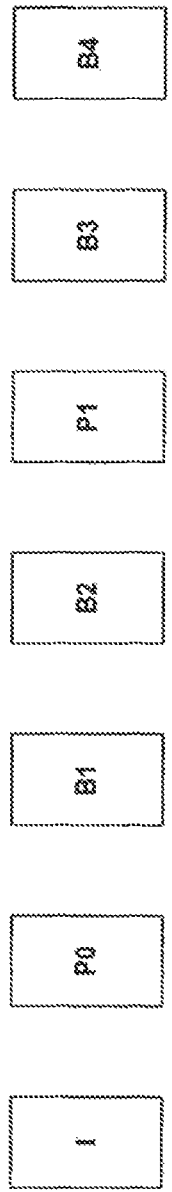

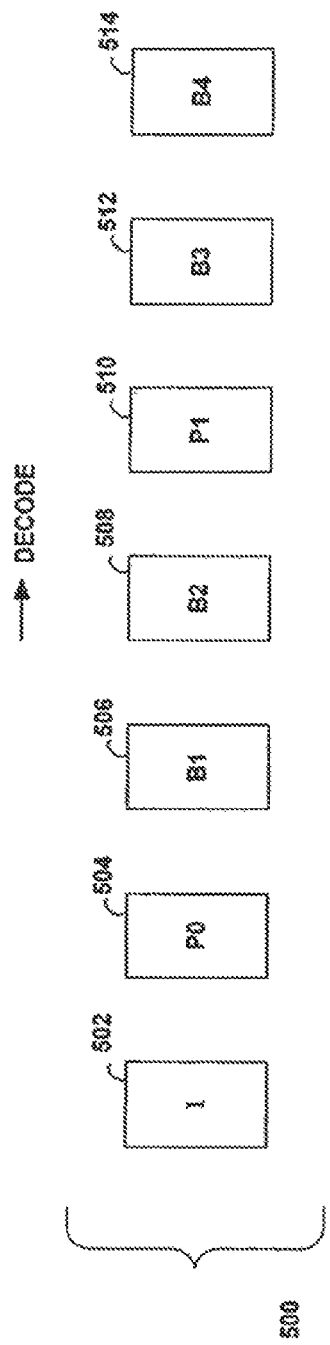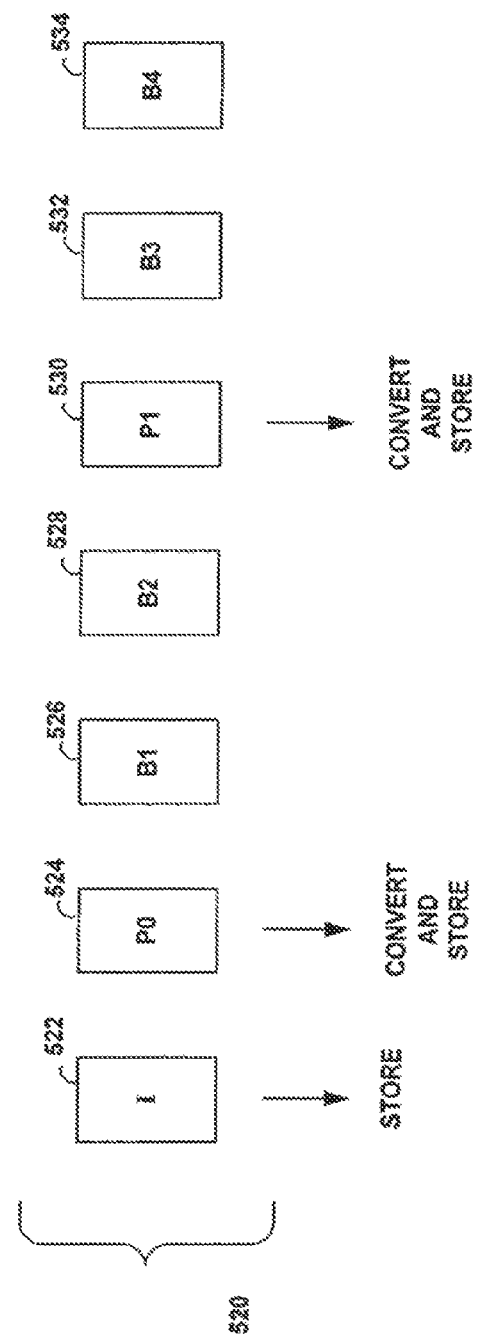

METHOD AND SYSTEM FOR PROVIDING FASTER CHANNEL SWITCHING IN A DIGITAL BROADCAST SYSTEM

CROSS REFERENCE TO RELATED APPLICATIONS

This application is a continuation of U.S. patent application Ser. No. 11/084,058, filed Mar. 17, 2005, which will issue as U.S. Pat. No. 8,249,113 on Aug. 21, 2012, which claims benefit to U.S. Provisional Application No. 60/554,715, filed Mar. 19, 2004 all of which are incorporated herein by reference in its entirety.

BACKGROUND OF THE INVENTION

The present invention generally relates to broadcasting systems and more specifically to a method and system for providing faster channel switching in a broadcasting system. Viewers of digital programs often experience significant delay when switching from one digital program to the next. In a digital cable or satellite system, program or channel switching is often handled by a set top box (STB). Typically, when a STB switches to a different program, there will be a 0.5 s to 1s delay before the desired program is displayed. This delay is caused by current limitations in real-time broadcasting systems.

For example, in a Moving Picture Experts Group (MPEG)-based system, video frames are typically compressed into three type of frames, namely, "I" frame, "B" frame, and "P" frame. An I-frame is the first frame of a sequence of frames that may depend on the I-frame either directly or indirectly as a reference frame. Thus, a transmission may include I frames, each followed by a sequence of dependent frames. I-frames may occur in a transmission, for example, once every 0.5 second. Usually, an I-frame has a relatively low compression ratio. Dependent frames may include P-frames and B-frames. A P-frame is encoded by reference to a past reference frame, which may be an I-frame or a P-frame. A B-frame is encoded by reference to a past reference frame, a future reference frame, or both a past and a future reference frame. Again, a reference frame may be an I-frame or a P-frame. Since I-frames are used as reference frames for subsequent P-frames and B-frames in such a broadcast system, a video program cannot be displayed correctly without any I-frames. One of the ways to reduce the delay between program switch is to insert more I-frames. The insertion of additional I-frames, however, means requiring more bandwidth in order to transmit one video program, and thus leads to a less efficient system.

Hence, it would be desirable to provide a method and system that is capable of achieving faster channel switch without sacrificing bandwidth performance.

BRIEF SUMMARY OF THE INVENTION

The present invention presents methods, apparatuses, and systems for switching between channels of encoded media data involving receiving encoded media data for a plurality of channels, wherein encoded media data for each of the plurality of channels comprises a plurality of frames of data including reference frames and dependent frames, wherein each dependent frame refers to at least one reference frame. Frames associated with a first channel from the plurality of channels are decoded to generate a decoded signal for the first channel. While decoding frames associated with the first channel, data corresponding to at least one reference frame associated with a second channel from the plurality of channels are stored. At least one control signal for switching from the first channel to the second channel is received, and in response to the at least one control signal, at least one dependent frame associated with the second channel is decoded by utilizing the stored data corresponding to the at least one reference frame associated with the second channel, to generate a decoded signal for the second channel.

The at least one reference frame associated with the second channel may consist of a latest received reference frame for the second channel. In one embodiment, data corresponding to the at least one reference frame associated with the second channel is stored in an I-frame format, regardless of whether the at least one reference frame is an I-frame or a P-frame. In another embodiment, data corresponding to the at least one reference frame associated with the second channel is stored in an alternative compression format different from a compression format of the encoded media data. In yet another embodiment, data corresponding to the at least one reference frame associated with the second channel is stored in an uncompressed format. In still yet another embodiment, data corresponding to the at least one reference frame associated with the second channel is stored in an I-frame format, if the at least one reference frame is an I-frame, wherein data corresponding to the at least one reference frame associated with the second channel is stored in a P-frame format, if the at least one reference frame is a P-frame.

The second channel may be, for example, a numerically next-higher channel relative to the first channel, a numerically next-lower channel relative to the first channel, and/or a previously selected channel. According to one embodiment of the invention, the encoded media data is encoded according to an MPEG-based video encoding scheme.

BRIEF DESCRIPTION OF THE DRAWINGS

FIG. 3 is a more detailed block diagram of various components of the video processor shown in FIG. 2 according to one embodiment of the present invention.

FIG. 4A depicts an illustrative sequence of I, P, and B-frames in MPEG-based compressed video data, shown in the order in which frames are displayed.

FIG. 4B depicts an illustrative sequence of I, P, and B-frames in MPEG-based compressed video data, shown in the order in which frames are transported.

FIG. 5A depicts the processing of a sequence of I, P, and B-frames contained in an active elementary stream, according to one embodiment of the present invention.

FIG. 5B depicts the processing of a sequence of I, P, and B-frames contained in an inactive elementary stream, according to an embodiment of the invention.

DETAILED DESCRIPTION OF THE INVENTION

The present invention in the form of one or more exemplary embodiments will now be described. In one exemplary aspect, a system of the present invention is able to substantially reduce the delay associated with channel switching that typically occurs under current cable and satellite broadcast systems.

Figure 1:
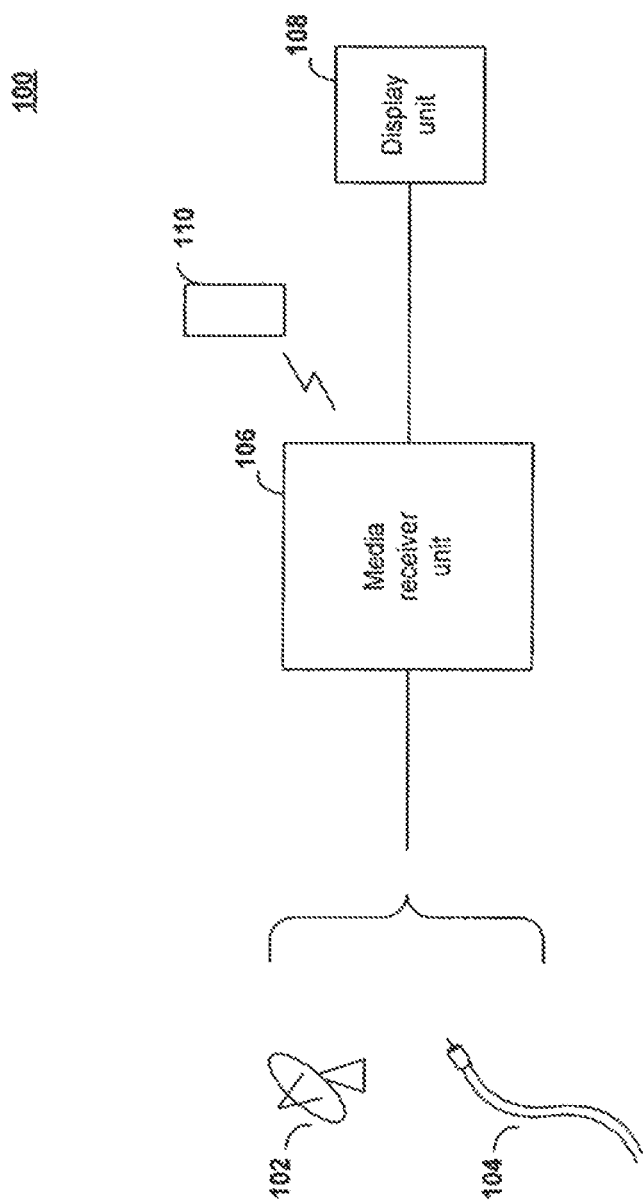
FIG. 1 presents an illustrative media transmission system suitable for deploying embodiments of the present invention.

FIG. 1 presents an illustrative media transmission system 100 suitable for deploying embodiments of the present invention. The system includes one or more media signal sources, such as satellite signal source 102 and cable signal source 104 which provide transmission signals, which may encompass media content for numerous content program channels, to a media receiver unit 106. Each content program channel may refer to a particular portion of media data that corresponds to a specific content program, such as a movie, a television show, newscast, etc. An example of media receiver unit 106 may be a STB. As shown in the figure, media receiver unit 106 processes the transmission signals and provides a presentation signal to a presentation unit 108, which outputs video, audio, and/or data signals to one or more users. An example of presentation unit 108 may be a television set in a home that presents video and audio outputs to a user. Generally speaking, transmission signals processed by system 100 comprise compressed digital data for multiple content program channels.

A remote control unit 110 may be used by the user to select the particular content program channel that is to be presented on presentation unit 108. Remote control unit 110 may accomplish this by transmitting a wired or wireless signal to media receiver unit 106 that indicates the user's selection of a content program channel. In this manner, the user is allowed to "change the channel."

Figure 2:
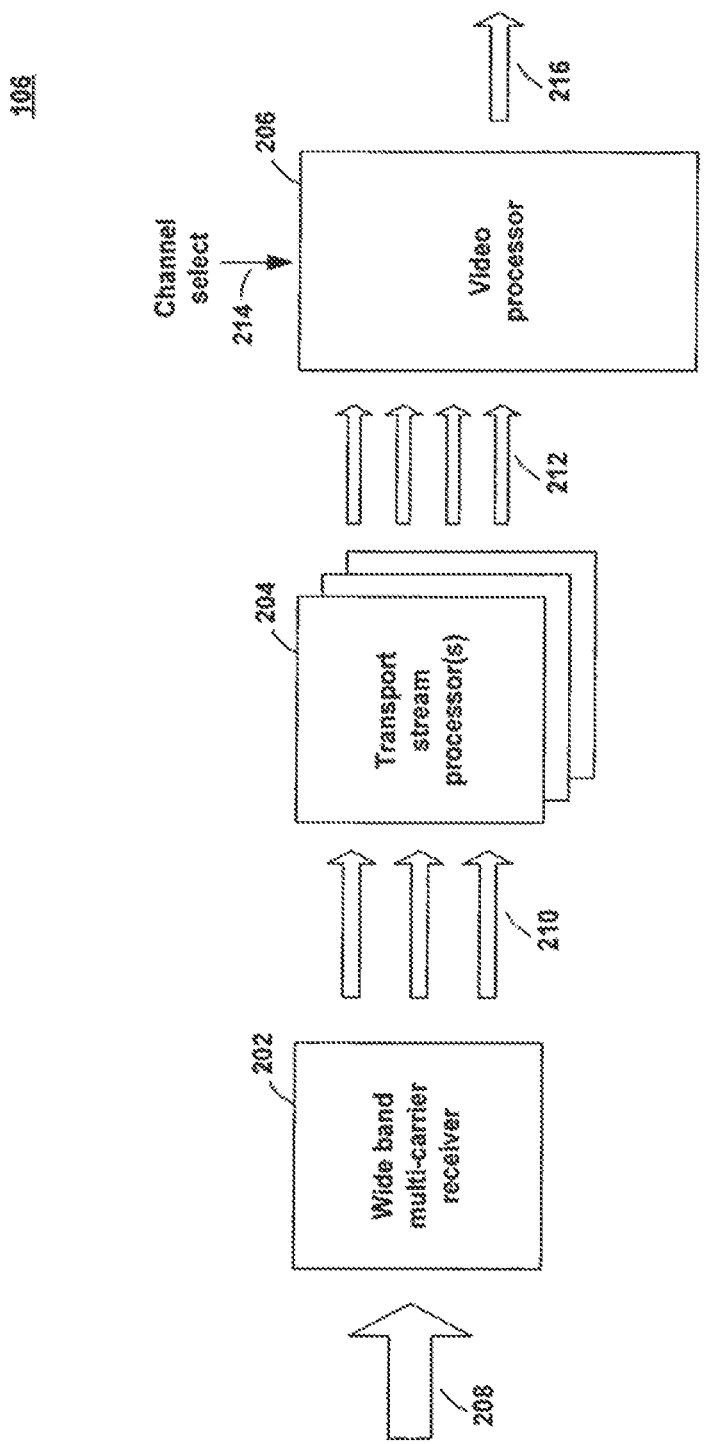
FIG. 2 presents a block diagram of the media receiver unit shown in FIG. 1 according to one embodiment of the present invention.

FIG. 2 presents a block diagram of media receiver unit 106 shown in FIG. 1, according to one embodiment of the present invention. As shown in this figure, media receiver 106 comprises a wide-band multi-carrier receiver 202, one or more transport stream processors 204, and a video processor 206. Wide-band multi-carrier receiver 202 receives and processes transmission signal 208. Transmission signal 208 may contain numerous signals modulated on multiple carriers. As such, wide-band multi-carrier receiver 202 may include equipment such as multiple demodulators suitable for demodulating transmission signal 208. The specific demodulation technique may depend on the modulation scheme utilized to modulate signals within transmission signal 208. These modulation schemes may vary widely, as is known in the art. Just as examples, these may include phase-shift keying schemes such as quadrature-phase-shift-keying (QPSK), amplitude modulation schemes such as quadrature-amplitude modulation (QAM), and so on. Whatever the modulation scheme used, wide-band multi-carrier receiver 202 utilizes the appropriate demodulators to demodulate transmission signal 208 and provide demodulated digital output representing data demodulated from the multiple carriers. In addition to demodulation, wide-band multi-carrier receiver 202 may also perform other receiver operations, such as error correction decoding and decryption. Appropriate error correction decoding and decryption techniques may vary depending on the implementation of the transmission system, as is known in the art.

According to the present embodiment of the invention, the demodulated output comprise individual transport streams 210 containing packets of data. Transport streams 210 represent a flexible format for organizing the transmission of data for multiple content programs. Packets of data for each content program may be appropriately identified and transmitted in one or more transport streams 210 such that the packets may later be processed and assembled to re-constitute the content program. Thus, each transport stream 210 may contain packets of data for multiple content programs. Conversely, multiple transport streams may contain packets of data for a single content program. Also, referring back to transmission signal 208, each carrier found in transmission signal 208 may be modulated with data for multiple transport streams 210. Conversely, multiple carriers may be modulated with data for a single transport stream 210.

One or more transport stream processors 204 receive and process the transport streams 210 to produce elementary streams 212. The transport stream processors 204 assemble the appropriate data packets for each content program from transport streams 210. Thus, each elementary stream 212 may comprise data for an individual content program. In one implementation, each transport stream processor 204 handles one transport stream 210. Such transport stream processors may forward data packets to and from one another in order to generate the proper elementary streams 212. In another implementation, a single transport stream processor 204 handles all of the transport streams 210. Each elementary stream 210 is a portion of compressed, digital data that represents a specific content program channel.

Video processor 206 receives and processes the multiple elementary streams 212 produced by the transport stream processor(s) 204. Video processor 206 also receives channel select signal 214 that indicates the selection of a particular content program channel by the user. Appropriate receiver components (not shown) may be included in media receiver unit 106 of FIG. 1 for receiving and processing the wired or wireless control signal from remote control unit 110. For example, if remote control unit sends a radio frequency (RF) control signal, an RF receiver may be employed by media receiver unit 106 to properly receive the RF control signal. Similarly, if remote control unit sends an infrared frequency (IF) signal, an IF receiver may be employed by media receiver unit 106 to properly receive the 1F control signal. The user's selection of a particular content program may thus be extracted from the wired or wireless control signal sent from remote control unit 110. This selection is presented to video processor 206 in the form of channel select signal 214.

Video processor 206 selects a particular one of the elementary streams 212 based on the channel select signal 214 and decompresses the selected elementary stream. This generates a decompressed presentation signal 216, which is outputted by video processor 206 and may be forwarded to a presentation unit, such as unit 108 in FIG. 1, to be displayed to a user. According to the present embodiment of the invention, when a user selects a new content program channel to be displayed, video processor 206 is capable of achieving a substantially improved response time in responding to the user's selection and changing the decompressed presentation signal 216 to represent the newly selected content program channel, as discussed below.

FIG. 3 is a more detailed block diagram of various components of video processor 216 shown in FIG. 2, according to one embodiment of the present invention. As shown in the figure, video processor 206 comprises an MPEG decoder 302, a preprocessor 304, and memory 306. MPEG decoder receives and decodes an active elementary stream 212(a) that represents the content program channel currently selected by the user. MPEG decoder 302 performs MPEG decoding on the compressed data in active elementary stream 212(a) to generate the decompressed presentation signal 216 that may be forwarded for display to the user. Preprocessor 304 receives a plurality of inactive elementary streams 212(b) that represent content program channels not currently selected by the user, but may be selected at any moment. Preprocessor 304 stores reference frames from the inactive elementary streams 212(b) in memory 306 to facilitate channel switching, from the content program channel represented by the presently active elementary stream 212(a) to a content program channel represented by one of the inactive elementary streams 212(b).

Thus, according to various embodiments of the invention, when the user selects a new content program channel represented by one of the inactive elementary streams 212(b), one or more reference frames for the newly selected content program channel are already available in memory 306 for use by MPEG decoder 302 to begin performing MPEG decoding on compressed data from the elementary stream representing the newly selected content program channel. The use of stored reference frames substantially eliminates the delay traditionally required in waiting for a subsequent reference frame in the elementary stream of the newly selected content program channel. Consequently, the amount of time associated with channel switching in order to present the newly selected content program to the user is significantly reduced. This also minimizes the delay between received frames and displayed frames. That is, the overall delay is minimized between when frames are received at media receiver unit 106 and when those frames are provided in a presentation signal for display on display unit 108.

According to an alternative embodiment of the invention, reference frames as well as dependent frames from a number of elementary streams, representing different channels, may be stored to provide buffered data for the different channels. The amount of buffering for each channel may correspond to the frequency of I-frames, for instance. Just as an example, if I-frames occur every 0.5 second on each channel, the amount of buffering may be a value greater than 0.5 second. When the user selects a new channel, the amount of time associated with channel switching is significantly reduced, because data for the newly selected channel is already available as buffered data. However, greater amounts of data storage space may be required to hold the data buffered for the different channels. Also, such buffering may introduce a delay (e.g., >0.5 second), between received frames and displayed frames. That is, a delay may be introduced between when frames are received at media receiver unit 106 and when those frames are provided in a presentation signal for display on display unit 108.

FIG. 4A depicts an illustrative sequence 400 of I, P, and B-frames in MPEG-based compressed video data, shown in the order in which frames are displayed. The sequence shown in this figure includes an I-frame (I), P-frames (P0 and P1), and B-frames (B1, B2, B3, and B4). The MPEG-based compression of video data based on I-frames, P-frames, and B-frames is known in the art and is briefly described below as an example.

An I-frame is encoded as an image independently, without reference to any past or future frame. The encoding scheme may be implemented in various ways. The encoding technique may utilize steps similar to those used in Joint Photographic Experts Group (JPEG)-based systems. For example, the image may be divided up into 8-pixel by 8-pixel blocks, which may be individually encoded. Each block may be transformed using a spatial-to-frequency transformation, such as a discrete cosine transform (DCT). The transformed blocks may then be quantized or reduced in some fashion to decrease the amount of data. Other techniques may also be utilized to optimize the compression operation. The encoding scheme thus produces an I-frame from an image. The I-frame constitutes compressed digital data that represents the original image.

A P-frame is encoded by reference to a past reference frame, which may be an I-frame or a P-frame. The past frame is typically the closest preceding reference frame. For example, frame P0 is encoded by reference to frame I; and frame P1 is encoded by reference to frame P0. In encoding each P-frame, an image may be divided up into 16-pixel by 16-pixel macroblocks. Each macroblock can be classified as either a I-macroblock or P-macroblock. An I-macroblock is encoded in a similar fashion as a block is encoded in an I-frame. A P-macroblock is encoded by referring to a corresponding macroblock in a past reference frame, plus an error term. A motion vector may also be specified as part of the data for a P-macroblock. The motion vector provides an indication of the relative movement of the corresponding macroblock from the past reference frame. Thus, a motion vector having a value of (0,0) indicates that the corresponding macroblock retains the same position and can be used directly, without any movement, as the reference for encoding the current macroblock. By utilizing the reference to a past reference frame, much of the data for a P-frame may be expressed by using the motion vector and the error term. Thus, the compression ratio associated with a P-frame is typically higher than that of an I-frame. When a P-frame is decoded, however, the reference frame is needed in order to arrive at the decoded image.

A B-frame is encoded by reference to a past reference frame, a future reference frame, or both a past and a future reference frame. Again, a reference frame may be an I-frame or a P-frame. The past frame is typically the closest preceding reference frame. The future frame is typically the closest subsequent reference frame. For example, frame B1 may be encoded by reference to frame I and/or frame P0; frame B2 may be encoded by reference to frame I and/or frame P0; frame B3 may be encoded by reference to frame P0 and/or frame P1; and frame B4 may be encoded by reference to frame P0 and/or frame P1. In encoding each B-frame, an image may be divided up into 16-pixel by 16-pixel macroblocks. In encoding each B-frame, an image may again be divided up into 16-pixel by 16-pixel macroblocks. Each macroblock may be encoded in a manner similar to that of a P-frame. However, instead of referencing only the past reference frame, the encoding of a B-frame may reference a corresponding macroblock from the past reference frame, a corresponding macroblock from the future reference frame, or both. If reference is made of both the past reference frame and the future reference frame, a motion vector may be calculated from the past and future reference frames and may not need to be specified as part of the data for a B-frame. The ability to refer to both the past reference frame and the future reference frame allows B-frames to take further advantage of the redundancy that may exist across multiple frames. The compression ratio associated with a B-frame may typically be higher than that of a P-frame.

Thus, I-frames and P-frames are considered reference frames because they may be utilized as references on which compression for other frames is based. P-frames and B-frames may be considered dependent frames, as compression of these frames may depend on one or more other frames. The compression scheme described above utilizing I, P, and B-frames is characteristic of MPEG-1, MPEG-2, and other MPEG-based video encoding algorithms. FIG. 4A merely presents an illustrative sequence of I, P, and B-frames. As shown in this figure, one I-frame is used along with two P-frames and four B-frames. However, the actual relative frequency of occurrence of I, P, and B-frames in a sequence of frames may vary according to the content of the video data being compressed and may also depend on implementation.

FIG. 4B depicts an illustrative sequence 420 of I, P, and B-frames in MPEG-based compressed video data, shown in the order in which frames are transported. These frames may be transported in an elementary stream, such as elementary streams 212, 212(a), and 212(b). Here, the order in which frames are transported (FIG. 4B) is different from the order in which frames are displayed (FIG. 4A). The order in which frames are transported as shown in FIG. 4B supports a decoding process that requires less delay. For example, in one embodiment, frame B1 may be coded by reference to both frame I and frame P0. In this case, the decoding of frame B1 cannot take place until both frame I and frame P0 are received. This can create a delay in the decoding process if frames are transported in the order shown in FIG. 4A. Specifically, when frame B1 is received, it cannot be decoded immediately. Instead, the decoding process must wait until frame P0 is received. By contrast, the order shown in FIG. 4B re-orders the frames such that required reference frames are sent before corresponding dependent frames. Thus, frame P0 is sent before frame B1. By the time frame B1 is received it can be immediately decoded because its reference frames I and P0 have already been received.

FIG. 5A depicts the processing of a sequence 500 of I, P, and B-frames contained in an active elementary stream such as elementary stream 212(a), according to one embodiment of the present invention. Sequence 500 is decoded and displayed as is known in the art. Sequence 500 is shown in the order in which frames are transported and may need to be re-ordered when it is displayed. Here, sequence 500 includes I-frame 502, P-frame 504, B-frame 506, B-frame 508, P-frame 510, B-frame 512, and B-frame 514. In sequence 500, the dependence of particular frames on reference frames may be similar to that described previously with respect to FIG. 4A. MPEG decoder 302 shown in FIG. 3, for instance, may be utilized to perform decoding operations on sequence 500 to generate presentation signal 216 for display to a display unit.

FIG. 5B depicts the processing of a sequence 520 of I, P, and B-frames contained in an inactive elementary stream such as one of the elementary streams 212(b), according to an embodiment of the invention. At the same time that sequence 500 from active elementary stream 212(a) is being decoded to display a selected content program channel to a display unit, one or more sequences 520 from inactive elementary streams 212(b) may be processed to store data corresponding to reference frames from content program channels that are not currently selected, in order to facilitate channel switching that may occur at any moment. In FIG. 5, only one sequence 520 is shown for purposes of illustration. However, it should be understood that multiple sequences from inactive elementary streams 212(b) may be processed in a similar fashion. Here, sequence 520 includes I-frame 522, P-frame 524, B-frame 526, B-frame 528, P-frame 530, B-frame 532, and B-frame 534. In sequenced 520, the dependence of particular frames on reference frames may be similar to that described previously with respect to FIG. 4A. Preprocessor 304 and memory 306 shown in FIG. 3, for instance, may be utilized to perform the processing of sequence 520 to store data associated with appropriate reference frames.

According to one embodiment of the invention, the latest reference frame received in sequence 520 is stored in the format of an I-frame, regardless of whether the reference frame is an I-frame or a P-frame. For example, frames in sequence 500 may be received in the order they are shown in FIG. 5B. That is, I-frame 522 may be received first, followed by P-frame 524, then by B-frame 526, then B-frame 528, then P-frame 530, then B-frame 532, and finally B-frame 534.

When I-frame 522 is received, it is the latest reference frame received. Thus, I-frame 522 is stored by preprocessor 304 in memory 306.

Next, when P-frame 524 is received, it becomes the latest reference frame received. Accordingly, preprocessor 304 converts P-frame 524 into the format of an I-frame, and stores the resulting I-frame in memory 306. As mentioned previously, an I-frame is encoded independently, without referring to any other frame. By converting P-frame 524 into the format of an I-frame, the converted data takes the form of a single frame that fully represents an image corresponding to the latest reference frame. For example, the conversion may be performed by decoding P-frame 524 into an image, which may involve using I-frame 522 as a reference. Once the decoded image is obtained, it is re-encoded into the format of an I-frame. The re-encoded I-frame is then stored in memory 306. This technique allows for the storage of just a single frame that represents the latest reference frame, which is P-frame 524 in this case. That is, it does not require the storage of both P-frame 524 and I-frame 522. According to the present embodiment of the invention, only the latest reference frame needs to be stored. Thus, when the re-encoded I-frame based on P-frame 524 and I-frame 522 is stored in memory 306, the previously stored I-frame 522 may be discarded. When B-frames 526 and 528 are received, they are discarded.

Next, when P-frame 530 is received, it becomes the latest reference frame received. Accordingly, preprocessor 304 converts P-frame 530 into the format of an I-frame, and stores the resulting I-frame in memory 306. Again, by converting P-frame 530 into the format of an I-frame, the converted data takes the form of a single frame that fully represents an image corresponding to the latest reference frame. The conversion of P-frame 530 is similar as that discussed above. For example, the conversion may be performed by decoding P-frame 530 into an image, which may involve using I-frame 522 and P-frame 524 as references. However, in this specific embodiment, instead of using I-frame 522 and P-frame 524 directly as references, P-frame 530 may be decoded by using the previously stored I-frame (which is based on I-frame 522 and P-frame 524) as a reference. Once the decoded image is obtained, it is re-encoded into the format of an I-frame. The re-encoded I-frame is then stored in memory 306. This technique allows for the storage of just a single frame that represents the latest reference frame, which is P-frame 530 in this case. That is, it does not require the storage of P-frame 530, P-frame 524, and I-frame 522. According to the present embodiment of the invention, only the latest reference frame needs to be stored. Thus, when the re-encoded I-frame based on P-frame 530, P-frame 524, and I-frame 522 is stored in memory 306, the previously stored I-frame based on P-frame 524 and I-frame 522 may be discarded. When B-frames 532 and 534 are received, they are discarded.

According to another embodiment of the present invention, the latest reference frame received in sequence 520 is stored in an alternative compression format different from the original compression format of the encoded data in sequence 520. For example, if the sequence 520 is encoded according to an MPEG-2 encoding scheme, the alternative compression format may be an MPEG-4, H.264 encoding scheme, or a Window Media encoding scheme. In this embodiment of the invention, the latest reference frame received, regardless of whether it is an I-frame or a P-frame, is converted to the alternative compression format and stored. If the latest reference frame is an I-frame, the conversion process may involve decoding the I-frame into an uncompressed image. The decoded I-frame is then re-compressed according to the alternative compression format and stored. If the latest reference frame is a P-frame, the conversion process may involve decoding the P-frame into an uncompressed image, by using a previous I-frame and/or P-frame as a reference. Also, instead of using the previous I-frame and/or P-frame directly as a reference, the decoding operation may be performed by using a previously stored re-compressed image in the alternative compression format as a reference. In that case, the previously stored re-compressed image fully represents the reference frame prior to the most recently received P-frame. Accordingly, the previously stored re-compressed image may be decompressed and used as the reference frame for decoding the most recently received P-frame. The decoded P-frame is then re-compressed according to the alternative compression format and stored.

According to yet another embodiment of the present invention, the latest reference frame received in sequence 520 is stored in an uncompressed format. In this embodiment of the invention, the latest reference frame received, regardless of whether it is an I-frame or a P-frame, is decoded into an uncompressed format and stored. If the latest reference frame is an I-frame, the conversion process may involve decoding the I-frame into an uncompressed image. The uncompressed image is then stored. If the latest reference frame is a P-frame, the conversion process may involve decoding the P-frame into an uncompressed image, by using a previous I-frame and/or P-frame as a reference. Also, instead of using the previous I-frame and/or P-frame directly as a reference, the decoding operation may be performed by using a previously stored uncompressed image as a reference. In that case, the previously stored uncompressed image fully represents the reference frame prior to the most recently received P-frame. Accordingly, the previously stored uncompressed image may be used as the reference frame for decoding the most recently received P-frame. The decoded P-frame is then stored as an uncompressed image.

According to still yet another embodiment of the invention, the latest reference frame received in sequence 520 is stored in its format as received, regardless of whether the reference frame is an I-frame or a P-frame.

When I-frame 522 is received, it is the latest reference frame received. Thus, I-frame 522 is stored by preprocessor 304 in memory 306.

Next, when P-frame 524 is received, it becomes the latest reference frame received. Accordingly, preprocessor 304 stores P-frame 524 in memory 306. Here, P-frame 524 does not contain all of the information required to decode into an uncompressed image, and reference to I-frame 522 is still needed. Thus, when P-frame 524 is stored in memory 306, I-frame 522 is not discarded from memory in this embodiment. When B-frames 526 and 528 are received, they are discarded.

Next, when P-frame 530 is received, it becomes the latest reference frame received. Accordingly, preprocessor 304 stores P-frame 530 in memory 306. Here again, P-frame 530 does not contain all of the information required to decode into an uncompressed image, and reference to P-frame 524 and I-frame 522 is still needed. Thus, when P-frame 530 is stored in memory 306, P-frame 524 and I-frame 522 are not discarded from memory in this embodiment. When B-frames 532 and 534 are received, they are discarded.

Referring back to FIG. 3, inactive elementary streams 212(*b*) may represent all or only some of the channels not currently selected by the user, according to different embodiments of the invention. As described previously, inactive elementary streams 212(*b*) represent certain content program channels not currently selected by the user for display on display unit 108. For example, if a user has selected "Channel 56" defined in a capable television broadcast system that provides Channels 1 through 100, the active elementary stream 212(*a*) may represent the selected content program channel, Channel 56. In that case, inactive elementary streams may be available for not-currently-selected content program channels, Channels 1-55 and 57-100. At any given moment, the user may utilize a control such as remote control unit 110 to select one of the not-currently-selected channels as a new channel to be displayed on display unit 108. Thus, any one of the Channels 1-55 and 57-100 may be selected by the user as the newly selected channel. All or some of these available inactive elementary streams may be forwarded as inactive elementary streams 212(*b*) to preprocessor 304, as described in further detail below.

According to one embodiment of the invention, all of the available inactive elementary streams representing Channels 1-55 and 57-100 are processed by preprocessor 304. For each of these not-currently-selected channels, a corresponding elementary stream 212(*b*) containing reference frames and dependent frames for that channel is processed by preprocessor 304 to store data associated with one or more reference frames, as described previously. Thus, when the user does select a new channel to display, it is guaranteed that data associated with one or more reference frames will be available in memory to facilitate quick channel switching to the channel. This embodiment of the invention may require a higher amount of processing and storage, because all of the not-currently-selected channels are processed to store relevant reference data. However, this embodiment may provide quick channel switching for all of the possible channels.

According to another embodiment of the invention, only some of the available inactive elementary streams representing channels likely to be selected by the user for display are chosen to be processed by preprocessor 304. For each of these likely-to-be selected channels, a corresponding elementary stream 212(*b*) containing reference frames and dependent frames for that channel is processed by preprocessor 304 to store data associated with one or more reference frames, as described previously. Thus, when the user selects one of the likely-to-be-selected channels, data associated with one or more reference frames will be available in memory to facilitate quick channel switching to the channel. This embodiment of the invention may require a lower amount of processing and storage, because only some of the not-currently-selected channels are chosen as likely-to-be-selected channels and processed to store relevant data. However, this embodiment may provide quick channel switching for only some of the possible channels.

Various predictive techniques may be implemented for choosing which channels are considered likely-to-be-selected channels. According to one technique, a channel that is the numerically next-higher channel, relative to the currently selected channel, may be chosen as a likely-to-be-selected channel. For example, if the currently selected channel displayed on display unit 108 is Channel 56, the numerically next-higher channel may be Channel 57. Thus, Channel 57 may be chosen as one of the likely-to-be-selected channels. Similarly, a channel that is the numerically next-lower channel, relative to the currently selected channel, may be chosen as a likely-to-be-selected channel. For example, if the currently selected channel displayed on display unit 108 is Channel 56, the numerically next-lower channel may be Channel 55. Thus, Channel 55 may be chosen as one of the likely-to-be-selected channels. According to another technique, a channel previously selected by the user before to the currently selected channel may be chosen as a likely-to-be-selected channel. For example, if the user selects Channel 3, then selects Channel 56, the previously selected channel, Channel 3, may be chosen as one of the likely-to-be-selected channels.

This technique is not necessarily limited to the previously selected channel. Thus, the system may store in memory a history of past channel selections and choose likely-to-be-selected channels based on this history.

Figure 6:
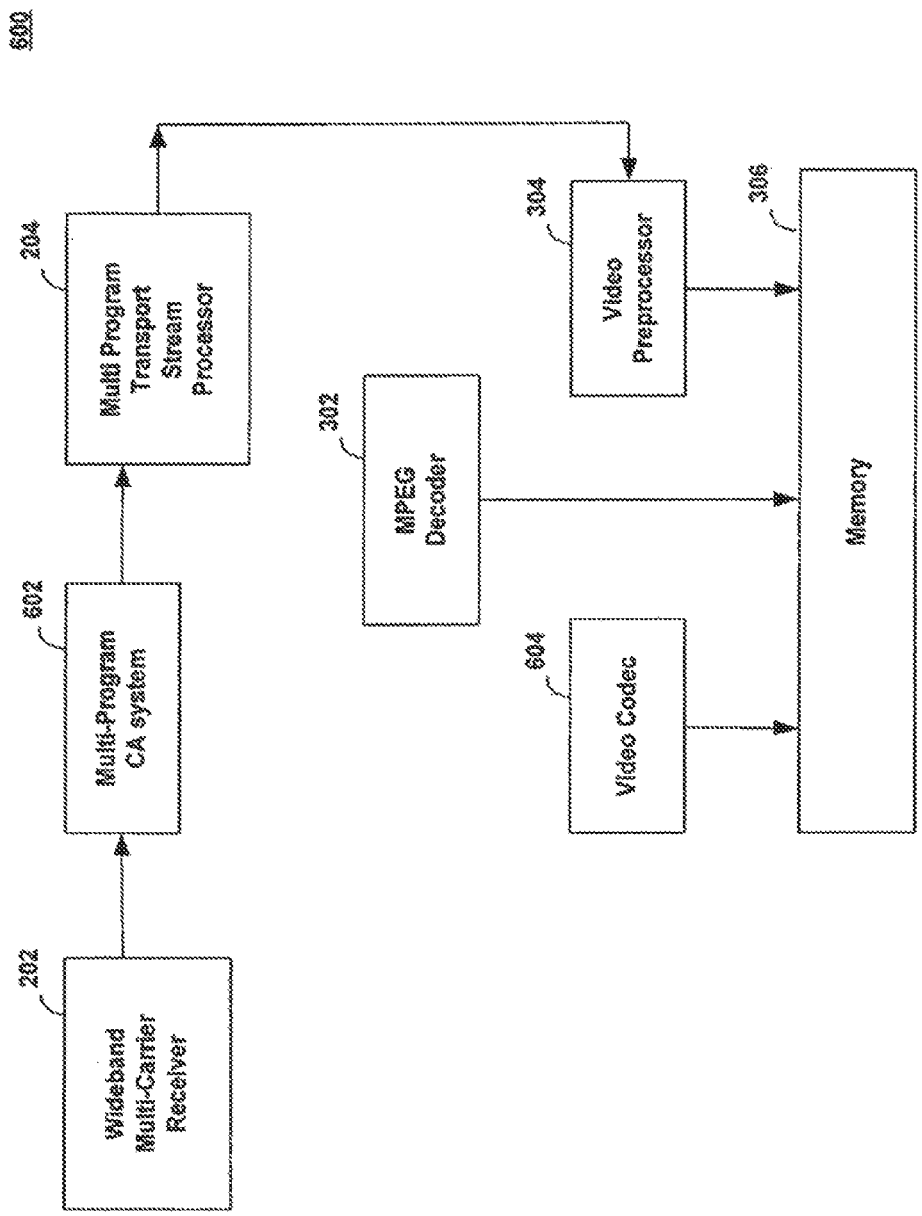
FIG. 6 illustrates an exemplary embodiment of a system of various components operating to facilitate quick channel switching in accordance with one embodiment of the present invention.

FIG. 6 illustrates an exemplary embodiment of a system 600 of various components operating to facilitate quick channel switching in accordance with one embodiment of the present invention. As shown in FIG. 6, system 600 includes a wideband multi-carrier receiver 202, a multi-program conditional access system 602, a multi-program transport stream processor 204, an MPEG decoder 302, a video preprocessor 304, a video codec 604 and a memory 306. System 600 demonstrates that various components may be arranged in different ways to implement the invention. For example, FIG. 6 shows that MPEG decoder 302, preprocessor 304, and memory 306 need not necessarily be organized in a separate module, such as video processor module 206 shown in FIGS. 2 and 3, to achieve an embodiment of the invention. The operation of system 600 is described in further detail below.

Wideband multi-carrier receiver 302 demodulates and decrypts a number of content programs. The content program includes a current program being viewed by a user and a number of other potential programs or next most likely programs that may be selected by the user for subsequent viewing. The number of content programs processed by the wideband multi-carrier receiver may vary depending on implementation. The output of multi-carrier receiver 302 may comprise transport streams containing packets of data, such as transport streams 210, as mentioned previously.

Multi-program conditional access system 602 and multi-program transport stream processor 204 collectively receives and processes the output from the wideband multi-carrier receiver. Multi-program conditional access system 602 may be utilized to enforce conditional access requirements as applied to the user. That is, the conditional access system may serve as a filter to block certain content while allowing certain other content to be forwarded along to multi-program transport stream processor 204. For example, conditional access may be used to implement differentiated levels of broadcast service based on different premiums collected, various levels of parental control over available content, etc. Multi-program transport stream processor 204 may process transport streams to produce elementary streams, such as elementary streams 212, as previously described. Thus, the output from the multi-program transport stream processor 204 may include a number of individual content programs contained in individual elementary streams.

MPEG decoder 302 receives and processes the content program that is being displayed for viewing by the user. Meanwhile, video preprocessor 304 receives all the other content programs and identifies packets that represent the I-frames and the P-frames. Video preprocessor 304 then writes these identified packets to memory 306.

According to this embodiment of the invention, the task of processing and storing data corresponding to relevant reference frames of not-currently-selected channels is divided between two separate modules, video preprocessor 304 and video codec 604. In embodiments described with respect to FIGS. 3 and 5, preprocessor 304 is described as being solely responsible for processing and storing data relevant to reference frames. By contrast, the present embodiment employs both a preprocessor 304 and a video codec 604 to accomplish this operation. Specifically, as shown in FIG. 6, video preprocessor 304 is responsible for identifying I-frames and P-frames and initially storing the I-frames and P-frames to memory 306, as a first step. Video codec 604 is then responsible for processing the I-frames and P-frames so that the latest reference frame received is converted into the format of an I-frame and stored back to memory 306. As mentioned previously, if the latest reference frame is a P-frame, this process may require the decoding of the P-frame into an uncompressed image by utilizing a previous I-frame as a reference, then re-encoding the uncompressed image as an I-frame. Here, video codec 604 performs these decoding, re-encoding, and storing operations, as subsequent steps. Video codec 604 may also store data for relevant reference frames by using an alternative compression format, an uncompressed format, etc., as previously discussed.

When a channel switch occurs, data corresponding to the latest reference frame of the selected channel is immediately available. Thus, as MPEG decoder 302 begins coding frames of data for the newly selected channel, MPEG decoder 302 needs not wait for a subsequent reference frame, such as an I-frame, to be received and processed before decoding dependent frames that refer to the reference frame. Instead, MPEG decoder 302 has immediate access to data corresponding to the latest reference frame of the newly selected channel, as the data is already stored in memory 306.

As discussed previously, according to an alternative embodiment of the invention, reference frames as well as dependent frames from a number of elementary streams, representing different channels, may be stored to provide buffered data for the different channels. In such an embodiment, frames of data for different channels simply need to be stored as buffered data. In the context of FIG. 6, wideband multi-carrier receiver 202, a multi-program conditional access system 602, a multi-program transport stream processor 204 may operate to store buffered data for a plurality of channels in memory 306. Here, video codec 604 may not be necessary, because the buffered data may be utilized by MPEG decoder 302 directly. For example, MPEG decoder 302 may access memory 306 to decode buffered data for a currently-selected channel. When a user selects a new channel, MPEG decoder may access memory 306 to decode buffered data corresponding to the newly-selected channel. Again, the amount of time associated with channel switching can be significantly reduced, because data for the newly-selected channel is already available as buffered data. However, there may be a certain amount of delay between received frames and displayed frames, as previously mentioned.

Thus, in accordance with different embodiments of the invention, the amount of time required to switch the channel can be significantly reduced. For example, in certain implementations, the amount of time required to switch the channel may be reduced from 0.5 to 1 second down to about the 20 millisecond range. Of course, the amount of time required to switch the channel for any particular system utilizing an embodiment of the invention can still vary and may differ depending on the implementation.

Figure 7:
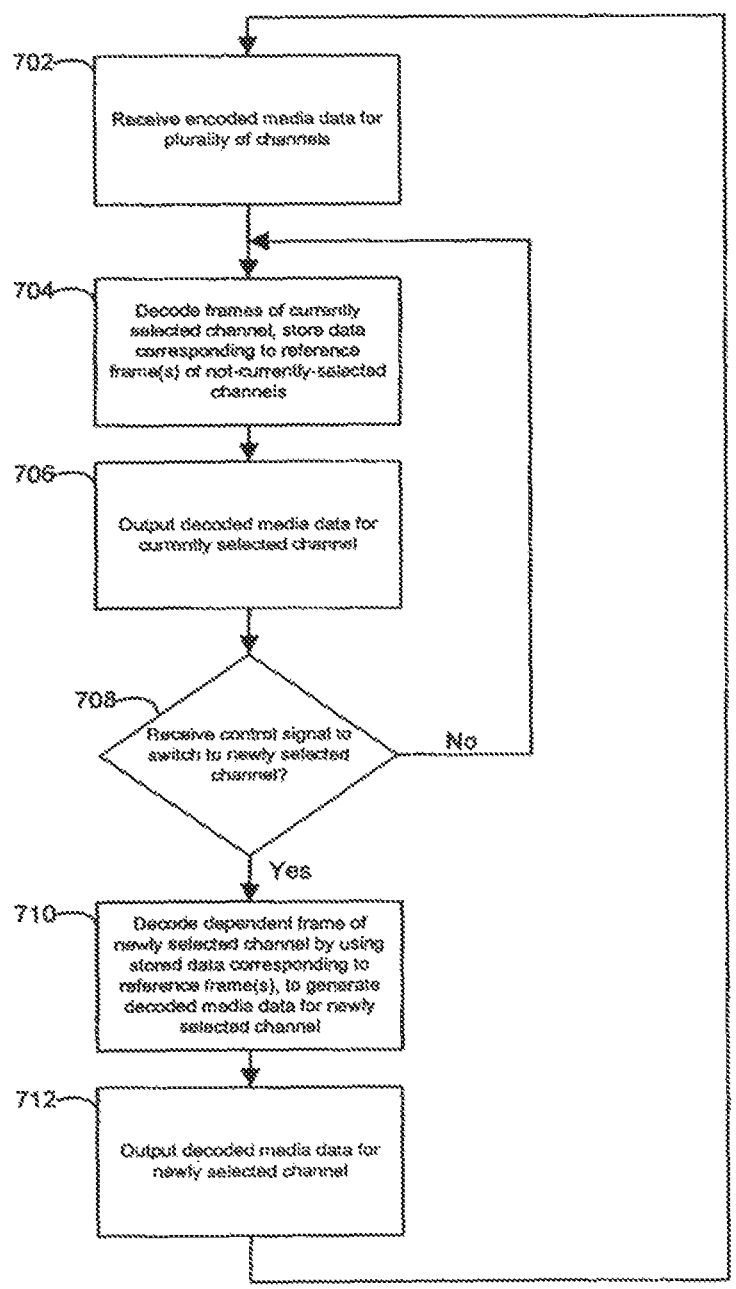
FIG. 7 is a flow chart presenting illustrative steps in a process for switching from a currently selected channel to a not-currently-selected channel, in accordance with one embodiment of the present invention.

FIG. 7 is a flow chart presenting illustrative steps in a process for switching from a currently selected channel to a not-currently-selected channel, in accordance with one embodiment of the present invention. In a step 702, the encoded media data for a plurality of channels are received. For example, in a system utilizing an MPEG-based scheme, encoded media data for each channel may comprise I-frames, P-frames, and B-frames of encoded data. In a step 704, frames of data of a currently selected channel are decoded to generate decoded media data. The decoded media data may comprise, for example, uncompressed images representing program content for the selected channel. Also in step 704, data corresponding to one or more reference frames from not-currently-selected channels are stored to memory. This may include all of the not-currently-selected channels, or just some of the not-currently-selected channels. In various embodiments of the invention, reference frames may be either I-frames or P-frames, and data corresponding to the latest reference frame received is stored. In one embodiment, the data stored in the format of an I-frame. In another embodiment, the data is stored in an alternative compression format different from a compression format of the encoded media data. In yet another embodiment, the data is stored in an uncompressed format. In still yet another embodiment, the data is stored in I-frame and/or P-frame format. In a step 706, the decoded media data generated at step 704 for the selected channel is outputted.

In a step 708, a determination is made as to whether a control signal has indicated a channel switch, to switch from the selected channel to a not-currently-selected channel (newly selected channel). If not, the process returns to step 704. If so, the process continues to step 710. In step 710, a dependent frame of the newly selected channel may be immediately decoded, by utilizing the data corresponding to reference frame(s) already stored in memory at step 704 for the newly selected channel. Thus, decoding on the newly selected channel can begin without waiting for a subsequent reference frame to be received on the newly selected channel. In various embodiments of the invention, dependent frames may be either P-frames or B-frames. In this manner, decoded media data can be quickly generated for the newly selected channel at step 710. After step 710, the process returns to step 702 and may repeat.

While the process illustrated in FIG. 7 is shown as comprising independent steps, it should be understood that operations associated with any particular step may take place during operations of another step. For example, the receipt of encoded media data for the plurality of channels, shown in step 702, may continue to occur even as other steps shown in FIG. 7 are executed. As another example, the decoding of frames of the currently selected channel and storage of data corresponding to reference frame(s) of not-currently-selected channels, shown in step 704, may continue to occur even as other steps shown in FIG. 7 are executed. These are just two examples, other steps shown in the figure may also continue to proceed while a different step is executed. FIG. 7 merely presents illustrative steps that outline the operation of a system according to an embodiment of the invention.

It should be understood that the present invention can be implemented using software, hardware, or a combination of both. Based on the disclosure and teachings provided herein, a person of ordinary skill in the art will appreciate other ways and/or methods to implement the present invention.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for switching between channels of encoded media data comprising:
   receiving encoded media data for a plurality of channels, wherein encoded media data for each of the plurality of channels comprises a plurality of frames of data including reference frames and dependent frames, wherein each dependent frame refers to at least one reference frame;
   concurrently decoding frames associated with a first channel from the plurality of channels to generate a decoded signal for the first channel,
   and storing a latest-received reference frame associated with a second channel from the plurality of channels;
   in response to receiving a control signal for switching from the first channel to the second channel, decoding at least one dependent frame associated with the second channel, by utilizing the latest-received reference frame corresponding to the at least one reference frame associated with the second channel, to generate a decoded signal for the second channel.

2. The method of claim 1, wherein storing the latest-received reference frame associated with the second channel includes storing in an I-frame format, regardless of whether the latest-received reference frame is an I-frame or a P-frame.

3. The method of claim 1, wherein storing the latest-received reference frame associated with the second channel includes storing in an I-frame format if the latest-received reference frame is an I-frame, and storing in a P-frame format if the latest-received reference frame is a P-frame.

4. The method of claim 1, wherein storing the latest-received reference frame associated with the second channel includes storing in an alternative compression format different from a compression format of the encoded media data.

5. The method of claim 1, wherein storing the latest-received reference frame associated with the second channel includes storing in an uncompressed format.

6. The method of claim 1, wherein the second channel is a numerically next higher channel, relative to the first channel.

7. The method of claim 1, wherein the second channel is a numerically next-lower channel, relative to the first channel.

8. The method of claim 1, wherein the second channel is a previously selected channel.

9. The method of claim 1, wherein the encoded media data is encoded according to an MPEG-based video encoding scheme.

10. The method of claim 1, further comprising:
    discarding a dependent frame associated with the second channel if the dependent frame is a B-frame.

11. An apparatus for switching between channels of encoded media data comprising:
    a receiver module configured to receive encoded media data for a plurality of channels, wherein encoded media data for each of the plurality of channels comprises a plurality of frames of data including reference frames and dependent frames, wherein each dependent frame refers to at least one reference frame;
    a decoder module configured to concurrently decode frames associated with a first channel from the plurality of channels to generate a decoded signal for the first channel, and to store a latest-received reference frame associated with a second channel from the plurality of channels; and
    a processor module configured, in response to receiving a control signal for switching from the first channel to the second channel, to decode at least one dependent frame associated with the second channel, by utilizing the latest-received reference frame associated with the second channel, to generate a decoded signal for the second channel.

12. The apparatus of claim 11, wherein the latest-received reference frame associated with the second channel is stored in an I-frame format, regardless of whether the latest-received reference frame is an I-frame or a P-frame.

13. The apparatus of claim 11, wherein the latest-received reference frame associated with the second channel is stored in an I-frame format if the latest-received reference frame is an I-frame, and stored in a P-frame format if the latest-received reference frame is a P-frame.

14. The apparatus of claim 11, wherein the latest-received reference frame associated with the second channel is stored in an alternative compression format different from a compression format of the encoded media data.

15. The apparatus of claim 11, wherein the latest-received reference frame associated with the second channel is stored in an uncompressed format.

16. The apparatus of claim 11, wherein the second channel is a numerically next-higher channel, relative to the first channel.

17. The apparatus of claim 11, wherein the second channel is a numerically next-lower channel, relative to the first channel.

18. The apparatus of claim 11, wherein the second channel is a previously selected channel.

19. The apparatus of claim 11, wherein the encoded media data is encoded according to an MPEG-based video encoding scheme.

20. The apparatus of claim 11, wherein the processor module is further configured to discard a dependent frame associated with the second channel if the dependent frame is a B-frame.

* * * * *

UNITED STATES PATENT AND TRADEMARK OFFICE
CERTIFICATE OF CORRECTION

| | | |
|---|---|---|
| PATENT NO. | : 8,687,656 B2 | Page 1 of 1 |
| APPLICATION NO. | : 13/589827 | |
| DATED | : April 1, 2014 | |
| INVENTOR(S) | : Zhang et al. | |

It is certified that error appears in the above-identified patent and that said Letters Patent is hereby corrected as shown below:

In the Claims:

In column 14, line 30, replace "next higher" with --next-higher--.

Signed and Sealed this
Eighth Day of July, 2014

Michelle K. Lee
*Deputy Director of the United States Patent and Trademark Office*